United States Patent [19]

Hermann et al.

[11] 3,998,792
[45] Dec. 21, 1976

[54] POLYVINYL BUTYRAL POLYMER MIXTURE FOR MAKING INTERMEDIATE SHEETING FOR LAMINATED GLASS

[75] Inventors: Hans Dieter Hermann, Neuenhain, Taunus; Joachim Ebigt, Frankfurt am Main; Klaus Fabian, Kriftel, Taunus, all of Germany

[73] Assignee: Hoechst Aktiengesellschaft, Frankfurt am Main, Germany

[22] Filed: Nov. 11, 1975

[21] Appl. No.: 631,190

[30] Foreign Application Priority Data

Nov. 13, 1974 Germany .......................... 2453780

[52] U.S. Cl. ................................ 260/73 L; 526/7; 526/9; 526/11
[51] Int. Cl.² .................. C08F 16/34; C08F 16/06
[58] Field of Search ............. 260/73 L, 874; 526/7, 526/9, 11

[56] References Cited

UNITED STATES PATENTS

| 2,135,075 | 11/1938 | Hermann | 526/9 |
| 2,690,410 | 9/1954 | Nelson | 260/73 L |
| 2,909,507 | 10/1959 | Cahill et al. | 260/73 L |
| 3,823,113 | 7/1974 | Reisman | 260/73 L X |
| 3,926,918 | 12/1975 | Shibata et al. | 260/73 L |
| 3,950,305 | 4/1976 | Schmidt | 260/73 L X |

*Primary Examiner*—Lucille M. Phynes
*Attorney, Agent, or Firm*—Curtis, Morris & Safford

[57] ABSTRACT

Mixtures of two distinct polyvinyl butyral grades, viz., one high viscosity and one low viscosity grade, both having a narrow molecular weight distribution exhibit good processing characteristics which nearly reach the performance of the high viscosity grades hitherto used.

4 Claims, No Drawings

POLYVINYL BUTYRAL POLYMER MIXTURE FOR MAKING INTERMEDIATE SHEETING FOR LAMINATED GLASS This invention relates to polymer mixtures on the basis of polyvinyl butyral especially suitable for making intermediate sheeting for laminated or safety glass.

Up to now, polyvinyl butyral has practically been the sole polymer the properties of which — i.e. strength, elongation at break, adhesion to glass and stability to radiation — comply, at least to a large extent, with demands made on sheetings for safety glass.

Hitherto, it has been rather difficult to optimize all properties asked for in processing and intended use. Sheets of high strength are obtained from high molecular weight polyvinyl butyral having a narrow molecular weight distribution. But this combination of properties yields a material having a poor tendency to flow at reasonable working temperatures resulting in long processing times. Attempts to remedy this drawback by a higher processing temperature result in a partial thermal decomposition whereby the mechanical properties are impaired. Products having a broad molecular weight distribution are more easy to process but have inferior mechanical properties.

When high molecular weight polyvinyl butyrals having a narrow distribution of the molecular weight are extruded at reasonable temperature with a high extrusion rate they tend to melt fracture. In the plasticizer containing polymer melt turbulences occur so that the extruded sheets become wavy on their surface.

To obtain polyvinyl butyral sheets having satisfactory properties it has been necessary so far to extrude suitable high molecular weight products under mild conditions and relatively slowly. More economical higher extrusion rates detrimentally affect the polymer quality.

The present invention provides a polymer mixture suitable for making, with an economical extrusion rate, polyvinyl butyral sheeting having a high strength and an unobjectionable surface, which polymer mixture essentially consists of polyvinyl butyral, usual plasticizers and optionally stabilizers and auxiliaries to improve the adhesion. In the polymer mixture according to the invention the polyvinyl butyral portion is a mixture of from 70 to 97.5% by weight of a polyvinyl butyral having a viscosity of 60 to 120 cp in a 5% solution in ethanol at 23° C and from 30 to 2.5% by weight of a polyvinyl butyral having a viscosity of 2 to 30 cp in a 5% solution in ethanol at 23° C, the ratio $[M_w/M_n]$ of the weight average to the numerical average of the molecular weight, determined by gel permeation chromatography, of the two polyvinyl butyral components being smaller than 5 and preferably from 1.5 to 3.

Especially good results are obtained with a mixture consisting of 75 to 95% by weight of a polyvinyl butyral having a viscosity of 70 to 100 cp and 5 to 25% by weight of a polyvinyl butyral having a viscosity of 3 to 20 cp.

The polyvinyl butyrals contained in the mixture of the invention are obtained by reacting polyvinyl alcohols having a corresponding molecular weight with corresponding narrow distribution with n-butyraldehyde in an acid medium. The polyvinyl alcohols to be used have a viscosity of 3 to 15 cp for the low molecular weight component and a viscosity of 25 to 40 cp for the high molecular weight component, the viscosities being measured at 20° C in a 4% solution in water.

The viscosities are measured according to DIN 53 015.

The chemical structure of the polyvinyl butyrals to be used according to the invention does not differ from those used hitherto for making sheeting. Besides vinyl butyral groups they contain 12 to 25% by weight, preferably 17 to 25% by weight vinyl alcohol groups and 0 to 10, preferably 0.5 to 5% by weight vinyl acetate groups.

The mixture of polyvinyl butyrals according to the invention can be prepared by simple mechanical mixing of the pulverulent components. Intimate mixing is especially important when the viscosities of the individual components are far asunder from each other.

An especially homogeneous and intimate mixture can be obtained by first preparing a solution of the corresponding polyvinyl alcohols and then acetalyzing the solution of the two components.

It is also possible, of course, to prepare the mixture of polyvinyl alcohols from a mixture of polyvinyl acetates with corresponding molecular weight distribution.

For the manufacture of sheeting from the polyvinyl butyral mixtures prior to or during processing a plasticizer must be added in usual manner. As is the case with known polyvinyl butyrals, the amount of plasticizer to be added is in the range of from 20 to 60 and generally 30 to 50 parts by weight plasticizer for 100 parts by weight polybutyral mixture. As plasticizer the usual compounds are added, for example esters of polyhydric alcohols or polybasic acids such as esters of triethylene glycol with aliphatic carboxylic acids having from 6 to 10 carbon atoms, especially 2-ethylbutyric acid, glycerol monooleate, dibytyl sebacate, di(β-butoxyethyl)-adipate, dioctyl phthalate and tricresyl phosphate. The plasticizers can be used either singly or in admixture with one another.

Substances which stabilize the mixture against decomposition may also be added, for example small amounts of an alkali or a salt having an alkaline reaction, as well as oxidation stabilizers for example phenols, bisphenols or terpene phenols substituted in 2-, 4- and/or 6-position.

The mixture may further contain additives to improve the adhesion of the sheets to one another or to glass, for example salts of carboxylic acids, fluorides, lecithin, or akylene ureas.

The aforesaid stabilizers as well as the further additives to improve the adhesion are generally added in an amount of from 0.001 to 1% by weight, calculated on the total mixture.

Polyvinyl butyral, plasticizer and optionally further additives are mixed in known manner by stirring at room temperature and optionally allowing the mixture to stand for a while or by kneading or rolling at elevated temperature, or directly during processing on the calender or extruder.

Alternatively, solutions of the components can be mixed and sheets cast from the mixture.

It is surprising that the polyvinyl butyral mixtures of the invention consisting of a high molecular weight portion and a low molecular weight portion each having a narrow molecular weight distribution have better properties as regards melt fracture and flowability than polyvinyl butyrals with low molecular weight or broad molecular weight distribution but that they yield under mild processing conditions sheets having approximately the same strength as products with poor processing properties having a high molecular weight and narrow molecular weight distribution. Under more severe and thus more economical processing conditions the products of the invention absorb less energy. Thus, they are subject to lesser thermal degradation and then have a higher strength than the high molecular weight products with narrow molecular weight distribution.

The proportion and viscosities of the polymer components in the mixtures of the invention are critical. Too high a proportion of the component of low viscosity yields a mixture that flows very readily so that the sheets extruded therefrom distort, while too high a proportion of the highly viscous component requires a high amount of energy for extrusion.

If the viscosity and molecular weight distribution of one of the components is outside the disclosed values the processing properties or the strength or both are affected.

The viscosities and the amounts of the two polymer components can be varied within the indicated limits, optimum proportions can be easily found by simple experiments and adapted to the required strength and processing properties. The mixing proportion depends not only on the type and amount of plasticizer used but to a minor extent also on the nature of the polyvinyl acetate used to prepare the polyvinyl alcohol and, hence, the polyvinyl butyral.

The following Examples illustrate the invention, the parts and percentages being by weight. The viscosities were measured according to DIN 53 015.

EXAMPLE 1

95% of a pulverulent polyvinyl butyral having a viscosity of 84 cp measured at 23° C in a 5% solution in 96% ethanol were mechanically mixed with 5% of a polyvinyl butyral having a viscosity of 5 cp, measured in the same manner. The polymers had a polyvinyl alcohol content of 19.0 and 19.2%, respectively. The polydispersity $M_w/M_n$, i.e. the quotient of the weight average molecular weight $M_w$ and the number average molecular weight $M_n$, determined by gel permeation chromatography, was 2.4 and 2.8, respectively. 100 Parts of the polymer mixture were stirred at room temperature with 41 parts of triethylene glycol di-2-ethyl-butyric acid ester and the mixture was allowed to stand overnight. The mixture was then extruded at 170° C on a laboratory extruder to yield strips of 1 mm · 15 mm. The melt index of the extruded strips was measured according to DIN 53 735 at 150° C under a load of 10 kg. It was found to be $i_{10}$ = 4.7 g/10 min.

EXAMPLE 2 (Comparison)

Example 1 was copied with the exception that exclusively the polyvinyl butyral having a viscosity of 84 cp was used without addition of the polymer of lower viscosity. After mixing with plasticizer and extrusion under the conditions of Example 1 the polymer had a melt index $i_{10}$ of 3.6 g/10 min.

The properties of the polymer of Example 1 and of the polymer of Example 2 are compared in Table 1. It can be seen that the addition of a low molecular weight polyvinyl butyral considerably improves the flowing properties of the polymer/plasticizer mixture.

EXAMPLE 3

A polyvinyl butyral was prepared from 80% polyvinyl alcohol having a viscosity of 29 cp, measured in a 4% solution in water at 20° C, and 20% polyvinyl alcohol having a viscosity of 9 cp measured in the same manner. Both polyvinyl alcohols had been prepared by transesterification of a polyvinyl acetate obtained in solution. They had a polydispersity $M_w/M_n$ of from 2 to 3.

100 parts of the polyvinyl butyral were mixed with 42 parts of a $C_6 - C_9$ fatty acid ester mixture of triethylene glycol and the mixture was extruded at 170° C on a laboratory test extruder of Messrs. Gottfert, Germany, using a hole type die having a diameter of 1.2 mm and a length of 30 mm. Under an internal pressure of 245 kg/cm$^2$ the throughput was 4.1 g/min., melt fracture could be observed from a throughput of 3.3 g/min. on.

The extruded mixture was pressed at 150° C into 0.8 mm thick sheets from which strips having a width of 15 mm and a length of 10 cm were punched out. The strips were kept for 2 days under standard conditions (23° C and 50% of relative atmospheric humidity). Thereafter, the tensile strength of the samples was determined under standard conditions according to DIN 53 455 using a device of Messrs. Instron. The sheets were clamped via deviating rolls with a clamping length of 50 mm. The drawing rate was 20 cm per minute. The data of tensile strength and elongation at break obtained are listed in Table 2.

EXAMPLE 4

In the manner described in Example 3 a polyvinyl butyral was prepared from 90% of polyvinyl alcohol with narrow molecular weight distribution and a viscosity of 29 cp and 10% of a polyvinyl alcohol with narrow molecular weight distribution and a viscosity of 4.5 cp (measured as specified in Example 3) and sheets were made therefrom. The data obtained are listed in Table 2.

EXAMPLE 5 (Comparison)

A polyvinyl alcohol mixture consisting of equal parts of a polyvinyl alcohol of 29 cp and a polyvinyl alcohol of 20 cp was acetalized. The viscosity was measured as described in Example 3. As in the preceding examples the acetalization was effected to an extent such that the polyvinyl butyral obtained had a residual content of 19.5 to 20.5% of vinyl alcohol units. The polymer was further processed and tested as described in Example 3. The results are listed in Table 2.

EXAMPLE 6 (Comparison)

Only one high molecular weight polyvinyl alcohol with narrow molecular weight distribution was used for acetalization. The polyvinyl butyral was prepared as described in Example 3 and the mixture with the plasticizer was tested under the same conditions. The results are listed in Table 2.

EXAMPLE 7 (Comparison)

Only one polyvinyl alcohol was acetalized but in contradistinction to the polyvinyl alcohols used in Examples 3 to 6 it had not been prepared via a vinyl acetate solution polymerization and had a broad molecular weight distribution $M_w/M_n$ of 6. Acetalization, further processing and testing were carried out under the conditions specified in Example 3. The results are listed in Table 2.

A comparison of the test results summarized in Table 2 clearly shows the superiority of the polymer mixtures of the invention. According to Examples 3 and 4 readily flowing polymer-plasticizer mixtures were obtained which exhibited melt fraction at relatively high extrusion rates only.

The polyvinyl alcohol mixture acetalized according to Example 5 did not come within the claimed limits. The difference between the viscosities of the individual polyvinyl butyral components was too small. The flowability of the polymer-plasticizer mixture was distinctly lower, melt fracture occured at a smaller throughput rate.

It was similar with the polymer of broad molecular weight distribution used in comparative Example 7.

With respect to flowability and melt fracture the polymer with narrow molecular weight distribution used in comparative Example 6 had particularly unfavorable properties. As compared to Example 3 the flowability was one half and the tendency to melt fracture was almost three times higher.

When comparing the tensile strength of the products polymers 3 and 4 nearly reached the strength of polymer 6 while the strength of polymers 5 and 7 was distinctly inferior.

The polymer/plasticizer mixtures of Examples 1 to 7 were processed under mild conditions under which the polymers are not damaged. In practice, above all on extruders of large dimension, the polymers tend to decompose. Such a decomposition results in poorer properties of the extruded sheets and the laminated glass made therefrom. An addition of stabilizers does not counteract completely such a decomposition.

The following examples are intended to demonstrate that the products in accordance with the invention are less sensitive to higher shearing forces.

EXAMPLE 8

100 Parts of a polyvinyl butyral were kneaded in a Brabender kneader in a closed air volume with 30 revolutions per minute and at a temperature of 170° C with 38 parts triethylene glycol di-2-ethylbutyric acid ester. The polymer had been prepared from a polyvinyl alcohol mixture consisting of 82% polyvinyl alcohol with $M_w/M_n$ equal to 2.1 and a viscosity (4% in water at 20° C) of 31 cp and 18% of a polyvinyl alcohol with $M_w/M_n$ equal to 2.4 and a viscosity of 8 cp. After acetalization the alcohol mixture contained 19.5% of vinyl alcohol units. Prior to kneading 0.4% of a terpene phenol had been added for stabilization. After a kneading time of 2 minutes the polymer-plasticizer mixture had a melt index $i_{10}$, measured according to Example 1, of 6.8 and after 10 minutes it was 7.0. Hence, only a minor decomposition had taken place.

EXAMPLE 9 (Comparison)

In the manner described in Example 8 a uniform polymer was stabilized and kneaded with plasticizer. The polymer was a polyvinyl alcohol with $M_w/M_n$ equal to 2.2 and a viscosity of 29 cp. After acetalization it contained 19.7% of vinyl alcohol units. After a kneading time of 2 minutes the mixture had a melt index $i_{10}$ of 3.8 and after 10 minutes it was 6.5.

The results obtained, summarized in Table 3, indicated that the decomposition of the product not in accordance with the invention was more distinct, i.e. it obviously commenced earlier than in the polymer mixture of Example 8. The reason therefor was probably the lower energy absorption of the product of the invention.

EXAMPLE 10

The polyvinyl butyral used having a polyvinyl alcohol content of 19.5% consisted of 80% of a polymer with narrow molecular weight distribution and having a viscosity of 80 cp and 20% of a polymer with narrow molecular weight distribution and a viscosity of 15 cp, the viscosities being measured in 5% solutions in 96% ethanol at 23° C. 100 Parts of the polymer were extruded together with 39 parts of a $C_7$–$C_9$ fatty acid ester of triethylene glycol at a die temperature of 170° C and a maximum temperature in the conveying zone of 230° C. The tensile strength of the extruded mixture was measured as described in Example 3. Sheets in the size 100 × 150 × 0.8 mm were produced from the extruded material which were used to make laminated glass by pressing for 30 minutes at 140° C under a pressure of 10 kg/cm². The glass plates at the outsides were 2 and 3 mm thick. With the 3 mm plate in upward position the composite structures were loosely placed on a suitable frame and tested with a falling cylindrical hammer having a weight of 2 kg and a diameter of 35 mm. The falling height was determined at which 50% of the polyvinyl butyral sheets between the glass plates did not show any crack. As indicated in Table 4 a falling height of 2.50 m was measured, corresponding to an average falling height of about 7.50 according to DIN 52 306 (dynamic method).

EXAMPLE 11 (Comparison)

Under the conditions specified in Example 10 one uniform polyvinylbutyral with narrow molecular weight distribution and having a viscosity of 80 cp and a polyvinyl alcohol content of 19.7% was extruded at the same temperature and with the same rate of throughput. The composite structures were prepared under the same conditions as in Example 10 and tested. The results are likewise indicated in Table 4.

A comparison of the results of Examples 10 and 11 in Table 4 shows that with the same extrusion rate the polymer of the invention was distinctly superior to the copolymer of comparative Example 11. The reason therefor was the more important decomposition of the comparative product having inferior flow properties.

TABLE 1

| | polyvinyl butyral | | | | | | | | | plasticizer parts/ 100 parts polymer | melt index $i_{10}$ (g/min) |
|---|---|---|---|---|---|---|---|---|---|---|---|
| Example No. | 1.) | (%) | visc. (cp) | PVA¹⁾ (%) | $M_w/M_n$ | 2.) | (%) | visc. (cp) | PVA¹⁾ (%) | $M_w/M_n$ | | |
| 1 | | 95 | 84 | 19.0 | 2.4 | | 5 | | 19.2 | 2.8 | 41 | 4.7 |
| 2 | | 100 | 84 | 19.0 | 2.4 | | — | — | — | — | 41 | 3.6 |

TABLE 1-continued

| | | | | polyvinyl butyral | | | | | | | plasticizer parts/ 100 parts polymer | melt index $i_{10}$ (g/min) |
|---|---|---|---|---|---|---|---|---|---|---|---|---|
| Example No. | 1.) | (%) | visc. (cp) | PVA[1] (%) | $M_w/M_n$ | 2.) | (%) | visc. (cp) | PVA[1] (%) | $M_w/M_n$ | | |
| (comparison) | | | | | | | | | | | | |

TABLE 2

| | Polymer | | | | | | Plasticizer | properties of polymer/plasticizer mixture | | | |
|---|---|---|---|---|---|---|---|---|---|---|---|
| Example No. | 1) starting PVA % visc. cp $M_w/M_n$ | | | 2) starting PVA % visc. cp $M_w/M_n$ | | | PVA content after acetalization % | parts per 100 parts polymer | through-put at 245 atm. g/min | melt fracture from through-put on g/min | tensile strength kg/cm² | elongation at break % |
| 3 | 80 | 29 | 2.4 | 20 | 9 | 2.6 | 19.5 – 20.5 | 42 | 4.1 | 3.3 | 215 | 295 |
| 4 | 90 | 29 | 2.4 | 10 | 4.5 | 2.5 | | | 3.6 | 2.8 | 210 | 290 |
| 5 (comparison) | 50 | 29 | 2.1 | 50 | 20 | 2.3 | | | 3.0 | 2.2 | 190 | 305 |
| 6 (comparison) | 100 | 28 | 2.0 | — | — | — | | | 2.0 | 1.2 | 220 | 270 |
| 7 comparison) | 100 | 30 | 6 | — | — | — | | | 3.1 | 2.4 | 185 | 320 |

PVA polyvinyl alcohol
1) PVA content

TABLE 3

| | polymer | | | | | | | plasticizer | melt index $i_{10}$ after kneading at 170° C with 30 rev./min | |
|---|---|---|---|---|---|---|---|---|---|---|
| Example No. | 1) starting PVA % visc. cp $M_w/M_n$ | | | 2) starting PVA % visc. cp $M_w/M_n$ | | | PVA content after acetalization % | parts per 100 parts polymer | after 2 minutes g/10 min | after 10 minutes g/10 min |
| 8 | 82 | 31 | 2.1 | 18 | 8 | 2.4 | 19.5 | 38 | 6.8 | 7.0 |
| 9 (comparison) | 100 | 32 | 2.2 | — | — | — | 19.7 | 38 | 3.8 | 6.5 |

TABLE 4

| | polyvinyl butyral | | | | plasticizer | | | |
|---|---|---|---|---|---|---|---|---|
| Example No. | 1) proportion % | visc. cp | 2) proportion % | visc. cp | PVA content | parts per 100 parts polymer | tensile strength kg/cm | falling height m |
| 10 | 80 | 78 | 20 | 15 | 19.5 | 39 | 215 | 2.50 |
| 11 (comparison) | 100 | 80 | — | — | 19.7 | 39 | 210 | 1.95 |

What is claimed is:

1. A polymer mixture for making intermediate sheeting for laminated glass essentially consisting of polyvinyl butyral, the usual plasticizers and optionally stabilizers and auxiliaries to improve the adhesion wherein the polyvinyl butyral used is a mixture consisting of 70 to 97.5% by weight of a polyvinyl butyral having a viscosity in the range of from 60 to 120 cp in a 5% solution in ethanol at 23° C and from 30 to 2.5% by weight of a polyvinyl butyral having a viscosity in the range of from 2 to 30 cp in a 5% solution in ethanol at 23° C, the ratio $M_w/M_n$ of the weight average to the numerical average of the molecular weight, determined by gel permeation chromatography, of the two polyvinyl butyrals being smaller than 5.

2. A polymer mixture as claimed in claim 1, wherein the ratio $M_w$ to $M_n$ is from 1.5 to 3.

3. A process for the manufacture of polyvinyl butyral mixtures as claimed in claim 1, which comprises acetalizing with n-butyraldehyde in the presence of an acid catalyst a mixture of 70 to 97.5 parts by weight of a polyvinyl alcohol having a viscosity of from 25 to 40 cp in a 4% aqueous solution at 20° C and 30 to 2.5 parts by weight of a polyvinyl alcohol having a viscosity of 3 to 15 cp in a 4% aqueous solution at 20° C, the ratio $M_w/M_n$ of the weight average to the numerical average of the molecular weight of the two polyvinyl alcohol components being smaller than 5.

4. A process as claimed in claim 3, wherein the ratio $M_w$ to $M_n$ is from 1.5 to 3.

* * * * *